Figure 4:
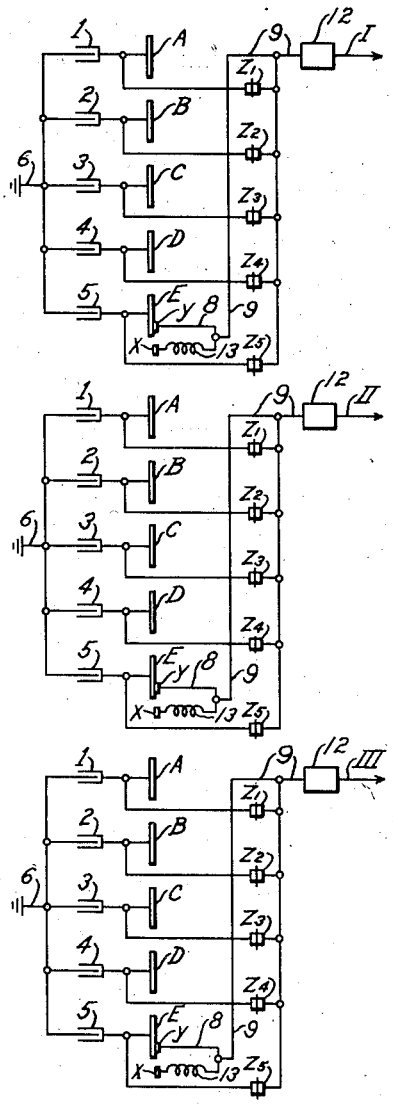

April 7, 1942.    R. D. EVANS ET AL    2,279,229
CONTROL APPARATUS
Filed May 14, 1941    3 Sheets-Sheet 1
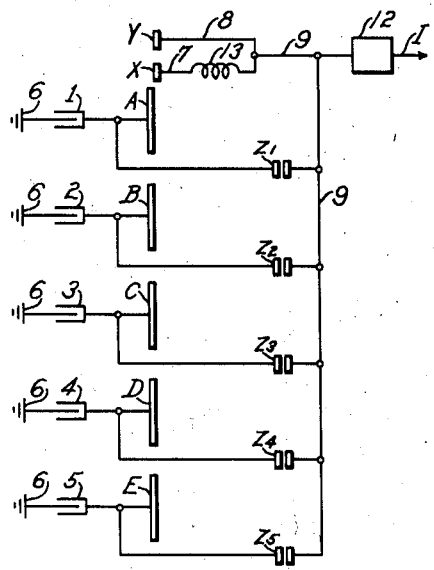
Fig. 1.
Sequence Chart
| Position | 0 | a | b | 1 | | 2 | | 3 | | 4 | | 5 |
|---|---|---|---|---|---|---|---|---|---|---|---|---|
| Switch X-A | | o | o | | | | | | | | | |
| Y-A | | | o | o | | | | | | | | |
| X-B | | | | | o | o | | | | | | |
| Y-B | | | | | | o | o | | | | | |
| X-C | | | | | | | | o | o | | | |
| Y-C | | | | | | | | | o | o | | |
| X-D | | | | | | | | | | o | o | |
| Y-D | | | | | | | | | | | o | o |
| X-E | | | | | | | | | | | | o | o |
| Y-E | | | | | | | | | | | | | o | o |
| Z₁ | | | o | o | o | o | o | o | o | o | o | o | o |
| Z₂ | | | | | o | o | o | o | o | o | o | o | o |
| Z₃ | | | | | | | o | o | o | o | o | o | o |
| Z₄ | | | | | | | | | o | o | o | o | o |
| Z₅ | | | | | | | | | | | o | o | o |
Fig. 2.
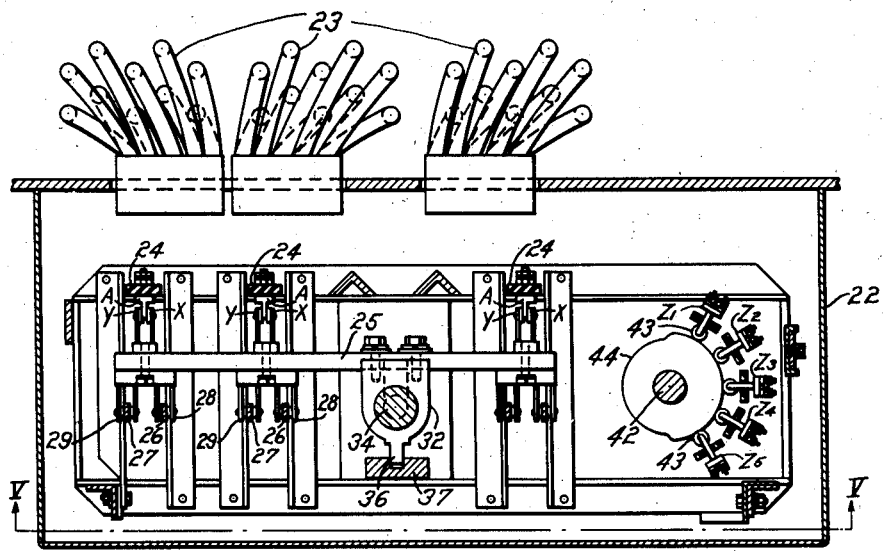
Fig. 3.
WITNESSES:
Wm. B. Sellers.
Nw. C. Groome
INVENTORS
Robert D. Evans and
Jesse E. Hobson.
BY Franklin E. Hardy
ATTORNEY April 7, 1942.   R. D. EVANS ET AL   2,279,229
CONTROL APPARATUS
Filed May 14, 1941   3 Sheets-Sheet 2

WITNESSES:

INVENTORS
Robert D. Evans and
Jesse E. Hobson
BY
ATTORNEY

Patented Apr. 7, 1942

2,279,229

UNITED STATES PATENT OFFICE 2,279,229

CONTROL APPARATUS

Robert D. Evans, Swissvale, and Jesse E. Hobson, Pittsburgh, Pa., assignors to Westinghouse Electric & Manufacturing Company, East Pittsburgh, Pa., a corporation of Pennsylvania Application May 14, 1941, Serial No. 393,470

6 Claims. (Cl. 172—246)

This invention relates to the automatic control of capacitors for use in power factor improvement on electric power circuits in relation to load or voltage conditions.

The increased use of capacitors for power factor improvement on industrial and distribution circuits has increased the demand for switching mechanisms which will connect or disconnect the capacitors to the circuit automatically in response to load or voltage conditions. There is a tendency in the industry to use large capacitor units controlled automatically to replace synchronous condensers equipped with voltage regulators, since the capacitor banks provided with automatic switching control are considerably more economical than are the rotating machines formerly used.

In using static capacitors to increase the kilowatt carrying capacity of power circuits and to improve the voltage conditions during full load periods, it is sometimes desirable to automatically control the connection of the capacitors to the line in relation to the design voltage, so that during the heavy load periods, when the voltage normally drops, the capacitors will be connected to the line and increase the voltage. When the load of the line is decreased and the voltage rises, the capacitors may be disconnected from the line to bring the voltage down.

In equipments of the character referred to, the switching mechanisms for connecting the several capacitor units to the line and for disconnecting them, when required, becomes complicated when the number of capacitor units to be operated increases above a relatively low number and difficulty is frequently experienced, because of surge voltages attending the switching in or out of the capacitor units unless complicated means are provided between the capacitors to prevent surge currents.

It is an object of the invention to provide for controlling the connection of the several capacitors of a bank in shunt relation to an electric circuit to provide a smooth voltage control over a wide range of capacitor values.

It is a further object of the invention to provide means for switching capacitors in shunt to an electric power circuit to provide smooth voltage control and that is free from high transient equalizing current surges at the time of switching the several units of the bank into or from the circuit.

Figure 7:
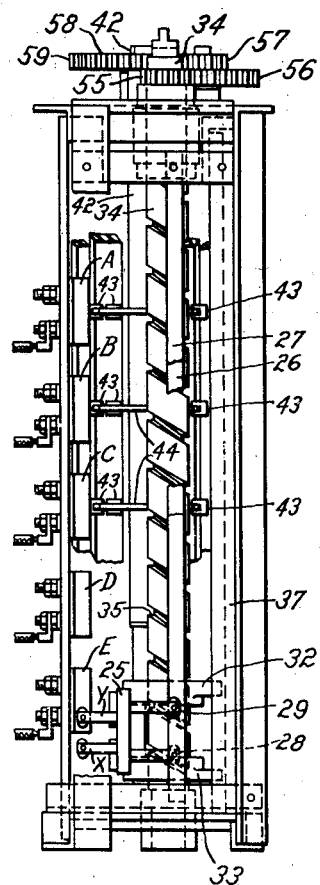
Figure 5:
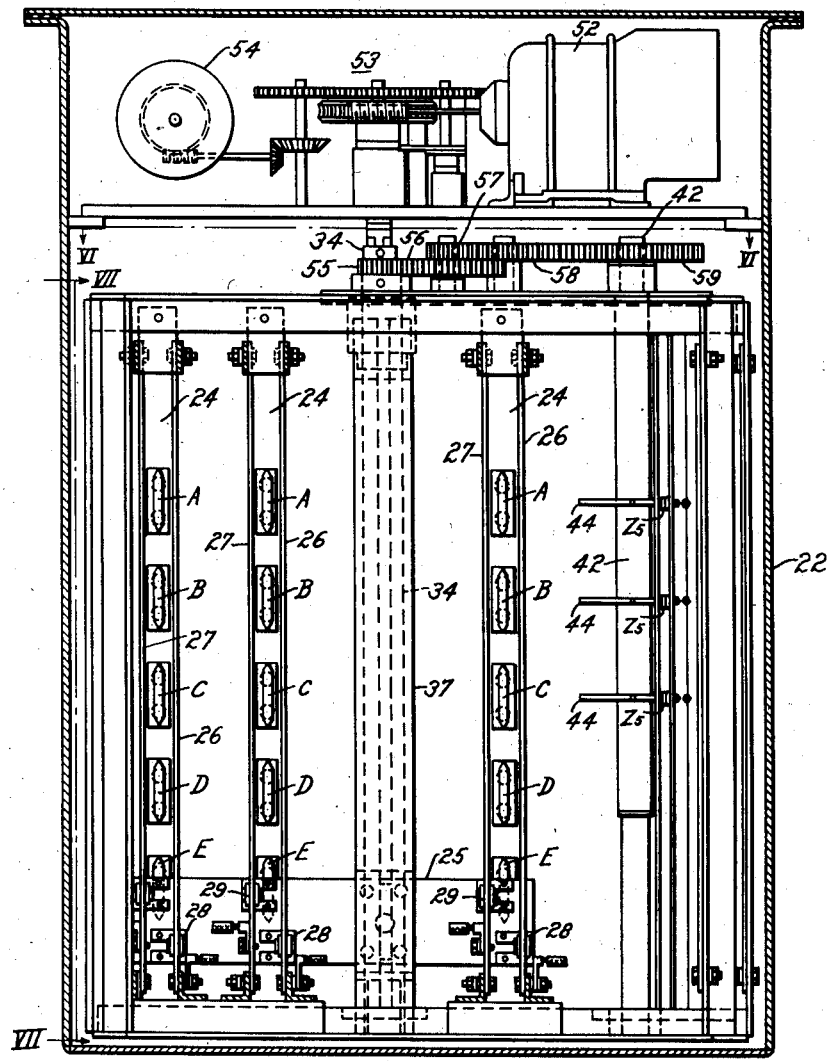
Figure 6:
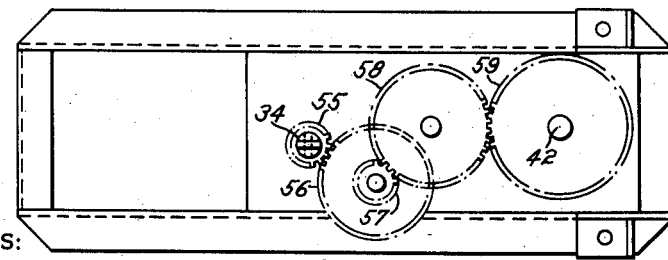

Other objects and advantages of the invention will be apparent from the following discussion of a preferred embodiment thereof, reference being had to the accompanying drawings, in which:

Figure 1 is a diagrammatic view of circuits and apparatus employed for switching a selected number of capacitor units across one phase of a power circuit, Fig. 2 is a sequence chart showing the operation of the several switches of the system in operating the equipment diagrammatically illustrated in Fig. 1, Fig. 3 is a horizontal sectional view through the apparatus showing how the various parts may be arranged for three phase operation, Fig. 4 is a diagrammatic view showing the circuits and apparatus arranged for three phase operation, Fig. 5 is a vertical sectional view taken on the line V—V of Fig. 3, Fig. 6 is a sectional view taken on the line VI—VI of Fig. 5, and Fig. 7 is an elevational view showing the arrangement of the connecting switches and their operating mechanism, the plane being taken on the line VII—VII of Fig. 5.

Referring to Fig. 1 of the drawings individual capacitor units 1, 2, 3, 4 and 5 are illustrated that are adapted to be connected between the power circuit conductor 1 and ground at 6 in accordance with switching mechanism which includes a plurality of switch segments A, B, C, D and E that are connected to the respective capacitor units and a pair of cooperating movable switch contact members X and Y that are connected to the power circuit conductor I through branch conductors 7 and 8, respectively, a common conductor 9 and a circuit breaker 12. A reactor 13 is connected between the contact member X and the common conductor 9 for a purpose to be later explained. Cam operated contactor switches Z1, Z2, Z3, Z4 and Z5 are provided for connecting the condensers 1 to 5, respectively, to the common conductor 9.

Fig. 2 is a sequence chart showing the sequence of operations of the several switches of the system as the switch operating mechanism advances from the position marked zero through positions 1, 2, 3, 4 and 5, the position zero designating that none of the capacitors is connected to the power circuit conductor I, and that for each numbered position a corresponding number of capacitor units 1 to 5 are connected. For each position of the switch operating mechanism indicated across the top of the chart, the switches indicated in the column at the left of the chart are closed when a zero appears in the square corresponding to the intersection of the vertical and horizontal spaces. It will be noted that between the numbered positions corresponding to the number of capacitor units connected to the line there are two intermediate positions. For example, on position zero the movable contact members X and Y are both above the conducting segment A, as indicated diagrammatically in Fig. 1, and all of the switches Z1 to Z5 are in their open circuit positions. As the mechanism moves to connect the first condenser 1 to the power circuit conductor I, the sliding contact members X and Y move downwardly and at an intermediate position *a* the contact member X is in engagement with the contact segment A, thus connecting the condenser I through the reactor 13 to conductor 9. As the mechanism continues to operate the movable contacts X and Y continue their downward path, the contact member Y engaging the conducting segment A in the second intermediate position *b* as shown on the chart, in which the contacts X—A and Y—A are both closed. In the third or final position for the first step of operation of the mechanism, the switch ZI is closed, thus connecting the condenser I directly to the conductor 9 independently of the movable contact members X and Y. In this position of the mechanism, the contact member X has advanced to a point between the conducting segments A and B and out of circuit closing engagement with either. As the mechanism continues to operate through repeated cycles, the contact members X and Y move downwardly along the several conducting segments B, C, D and E, and the associated capacitor unit, connected to each of these segments, is first connected to the conductor 9 through contact member X and reactor 13, then through contact member Y, then through the associated contactor switches Z2, Z3, Z4 or Z5.

When it is desired to operate the mechanism in reverse direction to disconnect any desired number of condenser units from the circuit, the mechanism moves in a direction to cause the contact members X and Y to move upwardly, thus reversing the operation of the several switches as shown on the chart in Fig. 2. The mechanism for effecting automatic control of the apparatus in response to variations in the voltage of the power circuit may be the same as that used for well known types of tap changing regulating apparatus in which a primary relay responsive to the voltage of the line operates to control a motor to effect its operation in the one or the other direction in accordance with the amount and direction of correction necessary. These motor control systems are well known and are not here illustrated, since they do not form a part of the present invention. Means are customarily provided on such motor control equipments so that when the motor starts to operate to effect a change in the regulating mechanism, the operation of the motor through one complete cycle or step of operation, corresponding to operation from one of the numbered positions to the next numbered position on the sequence chart in Fig. 2 is assured.

Fig. 4 is a diagrammatic view showing three banks of capacitor units each similar to the bank of units shown in Fig. 1 and similarly operated in synchronism to change the capacitor units connected across the three conductors I, II and III of a three-phase power circuit.

Figs. 3, 5, 6 and 7 show the mechanical arrangement of parts that may be employed for effecting the desired operation. The switching equipment is shown housed in a metal container 22 into which the several conductors 23 leading to the switch units A, B, C, D and E and to the switches ZI, Z2, Z3 and Z4 extend. The conducting segments A, B, C, D and E are arranged vertically in line with each other, as shown in Figs. 5 and 7, there being three sets of these, as shown in Figs. 3 and 5, one set for each of the three phases of the circuit. These segments may be mounted on a panel or strip of insulating material 24 for electrically separating them from one another. The movable contact members X and Y are mounted on a movable carriage 25 and are connected through travelling contact members 28 and 29 on the back thereof to vertically positioned strips 26 and 27, respectively. The conducting strips 26 and 27 correspond to the conductors 7 and 8 of the diagram in Fig. 1.

Brackets 32 and 33 are provided for supporting the travelling panel 25 and are positioned about a shaft 34 to engage a screw thread 35 best shown in Fig. 7, for causing vertical movement of the carriage 25 and the contact members 28 and 29 mounted thereon. An extension 36 from the bracket members 32 and 33 extend within a slot in a guide member 37 to more rapidly guide the bracket members 32 and 33 and prevent a tendency for them to rotate about the shaft 34. A second shaft 42 is provided for effecting operation of the cam switches ZI, Z2, Z3, Z4 and Z5 which are provided with rollers 43 for engaging the surface of cam 44 carried on the shaft 42. As best shown in Fig. 5, three such cams 42 are provided for the three phases or banks of capacitor units shown in Fig. 4, each operating a similar set of contactors ZI to Z5 in corresponding sequence.

Referring to Fig. 5, the switch operating shafts are controlled by the operation of a motor 52 connected through suitable gearing mechanism indicated generally at 53 to operate the worm shaft 34 and also a dial mechanism 54 for indicating which of the several switch changing steps the mechanism occupies at a particular time. The shaft 34 is provided with a pinion 55 that is connected through a chain of gear wheels 56, 57, 58 and 59, the latter being fixed on a shaft 42 for operating the several switches ZI to Z5 in proper sequence with respect to the movable contact members X and Y in correspondence with the chart shown in Fig. 2.

It will be apparent to those skilled in the art that modifications in the specific arrangement of structure and circuits may be made within the spirit of our invention, and we do not wish to be limited otherwise than by the scope of the appended claims.

We claim as our invention:

1. In apparatus for adjusting the capacitance connected in shunt to an electrical power circuit, in combination, a power circuit conductor, a plurality of capacitor units, switching means for varying the number of said capacitor units connected to said conductor comprising a plurality of stationary switch contact segments mounted in spaced relation and each connected to one of the capacitor units, a contactor associated with each capacitor unit for effecting communication between the capacitor unit and the power circuit conductor, a pair of spaced movable contact figures cooperating with said contact segments and individually connected to said circuit conductor, a reactor connected between one of said contact fingers and the circuit conductors, and mechanism for controlling the connection of said capacitor units to said circuit conductor operable in three steps in a switching operation for first connecting a capacitor unit to the power circuit conductor through the reactor and its associated contact finger, then through the other of said pair of contact fingers, and then through the contact associated with said capacitor unit, said pair of fingers being operable to repeat this cycle of operation for connecting each of the capacitor units to the conductor in sequence.

2. In apparatus for controlling the connection of capacitance to an electrical power circuit, in combination, a power circuit conductor, a plurality of capacitor units, switching means for connecting said capacitor units to said power circuit conductor in sequence comprising a plurality of stationary switch contact segments mounted in spaced relation and each connected to one of the capacitor units, a pair of spaced movable contact fingers for cooperating with said contact segments and connected to said circuit conductor, a reactor connected between said contact fingers and between one of said contact fingers and said circuit conductor, a contact finger operating shaft for moving said fingers in sequence along said contact segments, a contactor associated with each capacitor unit for effecting communication between the capacitor unit and the power circuit conductor, means including a shaft for effecting operation of said switching means, and mechanism for coordinating the operation of said shafts to effect the connection of a capacitor unit to said power circuit conductor first through one of said pair of contact fingers and its associated reactor, then directly through the other of said pair of contact fingers, then through the contactor associated with the capacitor unit, said mechanism being operable to repeat the cycle of operation for connecting each of the capacitor units to the conductor in sequence.

3. In apparatus for adjusting the capacitance connected in shunt to an electrical power circuit, in combination, a power circuit conductor, a plurality of capacitor units, switching means for varying the number of said capacitor units connected to said conductor comprising a plurality of stationary switch contact segments mounted in spaced relation and each connected to one of the capacitor units, a contactor associated with each capacitor unit for effecting communication between the capacitor unit and the power circuit conductor, a pair of spaced movable contact fingers cooperating with said contact segments and individually connected to said circuit conductor, a reactor connected between one of said contact fingers and the circuit conductors, and mechanism for controlling the connection of said capacitor units to said circuit conductor operable in steps in a switching operation for first connecting a capacitor unit to the power circuit conductor through the reactor and its associated contact finger, then directly through the other of said pair of contact fingers and through the contact associated with said capacitor unit, said switch mechanism being operable to repeat this cycle of operation for connecting each of the capacitor units to the conductor in sequence.

4. In apparatus for controlling the connection of capacitance to an electrical power circuit, in combination, a power circuit conductor, a plurality of capacitor units, switching means for connecting a desired number of said capacitor units in parallel circuit relation to said power circuit conductor in sequence comprising a plurality of stationary switch contact segments mounted in spaced relation and each connected to one of the capacitor units, a pair of spaced movable contact fingers for cooperating with said contact segments and connected to said circuit conductor, a reactor connected between said contact fingers and between a first one of said contact fingers and said circuit conductor, a contact finger operating shaft for moving said fingers in sequence along said contact segments, a contactor associated with each capacitor unit for effecting communication between the capacitor unit and the power circuit conductor, means including a shaft for effecting operation of said switching means, and mechanism for coordinating the operation of said shafts to effect connection of a capacitor unit to said power circuit conductor first through the first one of said pair of contact fingers and its associated reactor, then through the other of said pair of contact fingers in shunt relation through said reactor, then through the contactor associated with the capacitor unit, said mechanism being operable to repeat this cycle of operation for connecting each of the capacitor units to the conductor in sequence.

5. In apparatus for adjusting the capacitance connected in shunt to an electrical power circuit, in combination, a power circuit conductor, a plurality of capacitor units, switching means for varying the number of said capacitor units connected to said conductor comprising a separate contactor associated with each capacitor unit for effecting communication between the capacitor unit and the power circuit conductor, and control means common to all capacitor units for separately initiating the connection of each unit of the bank of capacitors to said conductor comprising a current limiting reactor, switch means for closing a circuit between a capacitor unit and said conductor through said reactor, switch means for thereafter closing a circuit between said capacitor unit and said conductor in shunt relation to said reactor, and operating means for operating said two switch means in the above-named sequence and for then actuating the separate contactor associated with the capacitor unit to its circuit closing position, said control means being operable through successive cycles of the above-defined sequence to increase the number of capacitor units connected to said conductor, and in a reverse sequence to decrease the number of capacitor units connected to said conductor.

6. In apparatus for adjusting the capacitance connected in shunt to an electrical power circuit, in combination, a power circuit conductor, a plurality of capacitor units, switching means for varying the number of said capacitor units connected to said conductor comprising a separate contactor associated with each capacitor unit for effecting communication between the capacitor unit and the power circuit conductor, and control means for initiating the connection of each unit of the bank of capacitors to said conductor comprising a current limiting reactor, switch means for closing a circuit between a capacitor unit and said conductor through said reactor, switch means for thereafter closing a circuit between said capacitor unit and said conductor in shunt relation to said reactor, and means for actuating the separate contactor associated with the capacitor unit to its circuit closing position, said control means being operable through successive cycles of the above-defined sequence to increase the number of capacitor units connected to said conductor, and in a reverse sequence to decrease the number of capacitor units connected to said conductor.

ROBERT D. EVANS.
JESSE E. HOBSON.